July 24, 1962 W. J. FAULKNER ETAL 3,046,024

PICKUP SYSTEM FOR PHONOGRAPHS

Filed Nov. 3, 1958

INVENTORS.
WILLARD J. FAULKNER.
ROBERT J. HAMMOND.

BY

Lockwood, Galt, Woodard & Smith.
ATTORNEYS.

United States Patent Office 3,046,024
Patented July 24, 1962

3,046,024

PICKUP SYSTEM FOR PHONOGRAPHS

Willard J. Faulkner, Coloma, and Robert J. Hammond, Niles, Mich., assignors to V-M Corporation, Benton Harbor, Mich., a corporation Filed Nov. 3, 1958, Ser. No. 771,412
9 Claims. (Cl. 274—23)

This invention relates generally to pickup systems for phonographs and more particularly it relates to a pickup cartridge adapted to operate independently of the tone arm.

Conventional pickup systems for phonographs comprise a tone arm which is mounted adjacent to the phonograph turntable for vertical and horizontal movement relative thereto. A pickup cartridge is mounted at the free end of the tone arm and is engaged and disengaged with respect to the phonograph record by movement of the tone arm.

Conventional pickup systems of this character have certain inherent faults or deficiencies such, for example, as excessive weight and excessive horizontal and vertical friction between the needle point and the record. Also, there is variation of the tracking angle of the needle with respect to the record groove due to the fact that the tone arm is pivotally mounted so that the tracking angle must change as the needle progresses from the outer groove of the record toward the center of the record. The weight of the conventional tone arm and pickup assembly also causes excessive needle pressure. In the case of record changers wherein records are stacked on the turntable, the needle pressure and the rake angle of the needle vary as one record after another is placed on the turntable.

Conventional tone arm and pickup systems inherently create distortion in reproduced sound. For example, records almost unavoidably become warped with age, and because of the vertical movement created by warped records, the reproduced sound is distorted in such a manner as to include an audible "wow." Also the reproduced sound may include rumble noises and microphonics generated by the phonograph motor and vibration and transmitted through the mechanical structure of the phonograph to the pickup cartridge.

Conventional tone arms support the pickup cartridge, and the structure necessary for such support limits the variation of artistic design of the tone arm. Similarly, the cost of the tone arm is increased because of this necessary structure. From the foregoing it will be apparent that there are many disadvantages inherent in the conventional phonograph pickup system.

Accordingly, the principal object of this invention is to provide a pickup system for phonographs of such character that the foregoing faults and deficiencies of the prior art are corrected to a major degree.

Another object of this invention is to provide a pickup system for phonographs wherein the pickup is freed of its operative association with the tone arm during the playing of a record, thereby to correct the faults and deficiencies of prior art systems which are caused by the mass and pivotal motion of the tone arm.

Still another object of this invention is to provide a pickup system for phonographs adapted to improve the quality of reproduced sound.

In accordance with this invention there is provided a pickup system for phonographs comprising a tone arm pivotally mounted for vertical and horizontal movement with respect to a phonograph turntable and having a pickup adapted to ride on a record to be played, said pickup being substantially free of said tone arm during the playing of a record and supported thereby during a record changing cycle, and pickup control means including a flexible hitch or link connected between the pivot point of said tone arm and said pickup.

The full nature of the in vention will be understood from the accompanying drawings and the following description and claims:

Figure 1:
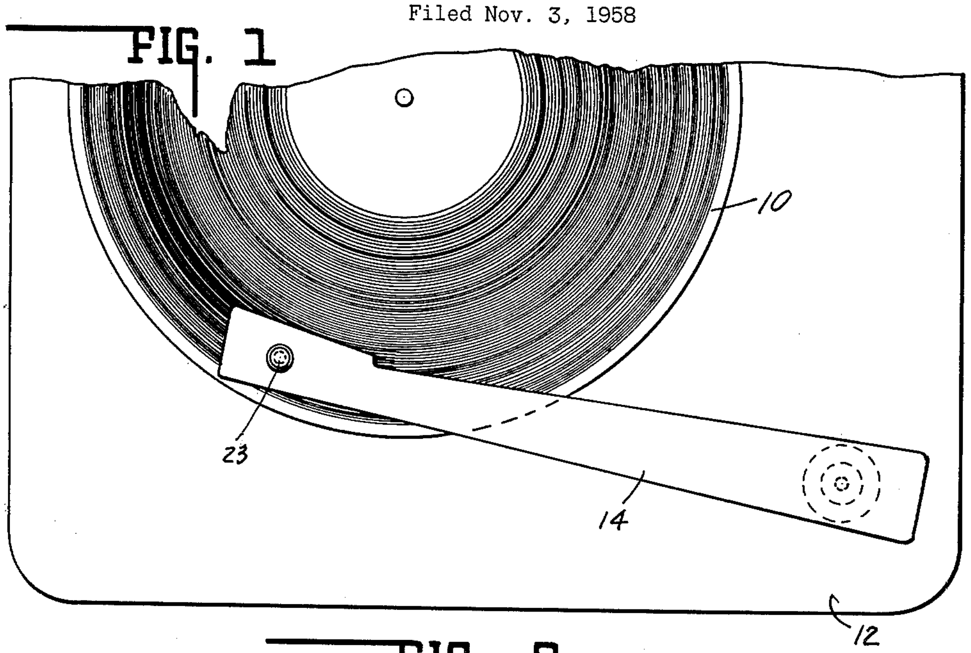
FIG. 1 is a partial top plan view of a phonograph including the pickup system of this invention.

This invention comprises a pickup system adapted to cooperate with a record 10 mounted on a conventional rotatable turntable 11 which, in turn, may be mounted on a base plate 12. The tone arm 14 is a more or less channel-like elongated member of conventional form pivotally mounted at 15 for vertical movement. The pivot 15 is supported in the eyes 16 formed in extensions of a rotatable tubular member 18 connected in accordance with conventional practice to a change cycle control mechanism (not shown) adapted to rotate the tone arm 14 outwardly beyond the edge of a record and inwardly to a point over the starting groove of a record, thereby to permit one record after another to be placed on the turntable for playing. For elevating and lowering tone arm 14 during a record changing cycle there is provided a vertically movable pin 20 also connected to and operated by the change cycle mechanism in accordance with conventional practice.

Figure 2:
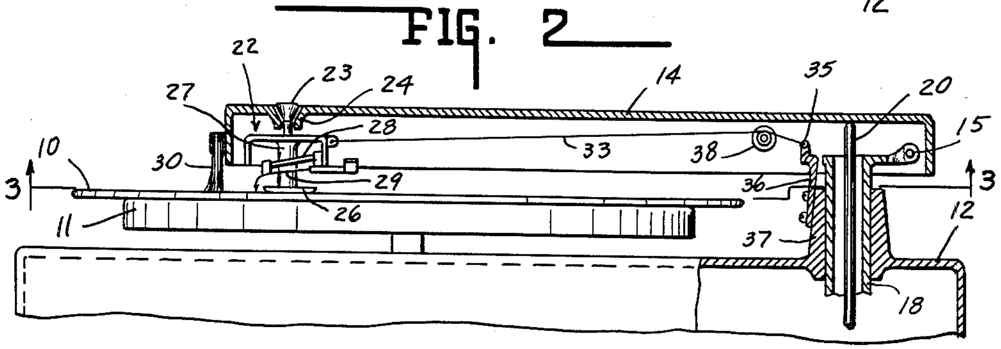
FIG. 2 is a side elevation and partial longitudinal cross section of the apparatus illustrated in FIG. 1.
Figure 3:
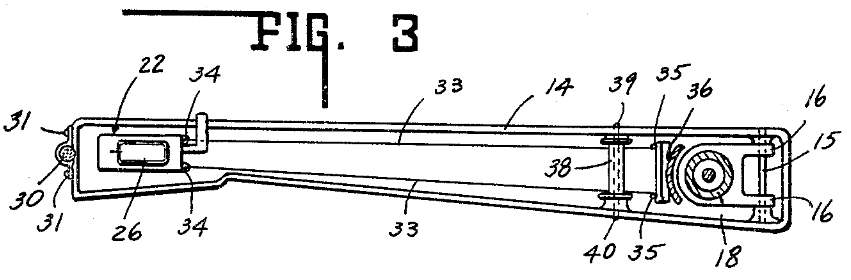
FIG. 3 is a bottom plan view of the pickup arm and pickup taken on line 3—3 of FIG. 2.

Conventional pickup arms support the pickup cartridge in fixed relation to the structure of the tone arm and, therefore, cause the various faults and deficiencies previously described herein. In accordance with this invention a pickup cartridge 22 is provided with a supporting member 23, the head portion of which is conical and is disposed within conical support 24 formed in tone arm 14 as illustrated in FIGS. 1 and 2. When the tone arm is elevated by pin 20, conical member 24 engages the pickup cartridge support 23 to lift it free of the record.

When the tone arm is in its playing position, as shown in FIG. 2, the cartridge 22 rides on the record, there being a pad 26 formed of a relatively soft material such as felt and supported from the frame of pickup 22 by means of a bracket member 27. Otherwise, the pickup 22 includes a conventional crystal 28 and a stylus 29, these members being mounted in conventional fashion.

For guiding the tone arm 14 from the outer edge of the record inwardly toward the center of the record, there is provided a brush 30 fixed at 31 to the end of tone arm 14 and having bristles as shown for engaging the playing grooves of the record. As the record rotates, the bristles cause the tone arm to move inwardly toward the center of the record and follow the spiral path of the playing groove. For guiding the pickup 22 there is provided a means consisting of a flexible hitch or link comprising a pair of strings or very fine wires 33 anchored to pickup 22 at opposite corners 34 thereof and also anchored at spaced points 35 of plate member 36 which is fixed to a boss 37 extending upwardly from the turntable and forming a part thereof. It will be noted that strings or wires 33 pass over a spool member 38 mounted in the sidewalls of tone arm 14 in any suitable manner as shown at 39 and 40.

In operation, the tone arm rotating and elevating mechanism 18, 20 lowers the tone arm to engage the brush 30 with the record and to engage the stylus 29 of pickup 22 with the record. As illustrated in FIG. 2, brush 30 is of such a length that the conical support member 23 of pickup 22 is free of the tone arm whereby pickup 22 rests on the record by reasons of the engagement of pad 26 with the record.

As the record rotates, brush 30 guides the tone arm 14 inwardly toward the center of the record and stylus 29 guides the pickup 22 inwardly toward the center of the record at the same rate of movement as that of the tone arm, thereby maintaining the pickup in its free relationship to the tone arm.

The strings or wires 33 being anchored to a stationary structure at 35 cause the pickup 22 to move inwardly with the record groove in constant tangential relation thereto, thereby preventing any change of tracking angle between the stylus 29 and the record groove. It should be noted that the member 38 has the effect of lifting the anchorage point of strings 33 as one record after another is stacked on the turntable. This maintains a constant horizontal angular relationship, or rake angle, of stylus 29 with respect to the record even though one or more records are on the turntable.

From the foregoing description it will be apparent that this invention corrects the various faults and deficiencies which were previously set forth herein. Friction and pressure have been reduced to a minimum by reason of the fact that the weight of the tone arm is not transferred to stylus 29, and the weight of the pickup cartridge itself is supported on the pad 26 whereby stylus 29 may be adjusted relative to the pad 26 to bear on the record with predetermined and fixed pressure. There is no change of tracking angle between stylus 29 and the record groove as the stylus moves toward the center of the record. Acoustically, the operation is improved to a marked degree because the string members 33 do not transmit sound and, hence, rumble noises and microphonics are not transferred through the tone arm to the pickup cartridge. "Wow" noise is also eliminated due to the fact that the pickup cartridge rides on the record and warped records do not cause vertical movement of the stylus 29. This is because of the fact that the pad 26 maintains a constant relationship between the stylus and the record regardless of any warping of the record.

The invention claimed is:

1. A pickup system for a phonograph having a base plate and a rotatable turntable for playing records comprising a tone arm, mechanism for supporting said tone arm for horizontal and vertical movement with respect to said turntable, a pickup including a stylus and operatively associated with said tone arm and including a support coupled to said tone arm for limited vertical movement with respect thereto, a pad attached to said pickup for supporting it on a record with the stylus engaging the playing groove and moving said pickup support vertically of said tone arm for freeing said pickup of vertical support by said tone arm when the pad engages a record, a pair of parallel string members extending between spaced points on said pickup and spaced points on said tone arm support mechanism for holding said pickup in tangential relation to the playing groove of the record as the pickup stylus tracks said playing groove, and a spool mounted transversely of said tone arm in engagement with said string members for elevating and lowering them with vertical movement of said tone arm.

2. A pickup system for a phonograph having a base plate and a rotatable turntable for playing records comprising a tone arm, mechanism for supporting said tone arm for horizontal and vertical movement with respect to said turntable, a pickup including a stylus and operatively associated with said tone arm and including a support coupled to said tone arm for limited vertical movement with respect thereto, a pad attached to said pickup for supporting it on a record with the stylus engaging the playing groove and moving said pickup support vertically of said tone arm for freeing said pickup of vertical support by said tone arm when the pad engages a record, a pair of parallel string members extending between spaced points on said pickup and spaced points on said tone arm support mechanism for holding said pickup in tangential relation to the playing groove of the record as the pickup stylus tracks said playing groove.

3. A pickup system for a phonograph having a base plate and a rotatable turntable for playing records comprising a tone arm, mechanism for supporting said tone arm for horizontal and vertical movement with respect to said turntable, a pickup including a stylus and operatively associated with said tone arm for limited vertical movement with respect thereto, a pad attached to said pickup for supporting it on a record free of vertical support by said tone arm with the stylus engaging the playing groove, a pair of parallel flexible members extending between spaced points on said pickup and spaced points on said tone arm support mechanism for holding said pickup in tangential relation to the playing groove of the record as the pickup stylus tracks said playing groove, and means for elevating and lowering said flexible members with vertical movement of said tone arm.

4. A pickup system for a phonograph having a base plate and a rotatable turntable for playing records comprising a pickup including a stylus, means including a pad attached in fixed relation to said pickup for supporting it on a record with the stylus engaging the playing groove, and means including a pair of parallel flexible members anchored between spaced points on said pickup and spaced points on said base plate for holding said pickup in tangent playing relation to the playing groove of a rotating record.

5. A pickup system for a phonograph having a base plate and a rotatable turntable for playing records comprising a tone arm, mechanism for supporting said tone arm for horizontal and vertical movement with respect to said turntable, a pickup including a stylus and operatively associated with said tone arm and including means coupled to said tone arm for permitting limited vertical movement of said tone arm with respect to said pickup, means attached to said pickup for supporting it on a record with the stylus engaging the playing groove and moving said pickup vertically of said tone arm for freeing said pickup of vertical support by said tone arm when the pickup engages a record, a pair of flexible members extending between spaced points on said pickup and spaced points on said tone arm support mechanism for holding said pickup in tangential relation to the playing groove of the record as the pickup stylus tracks said playing groove, and means for elevating and lowering said flexible members with vertical movement of said tone arm.

6. A pickup system for a phonograph having a base plate and a rotatable turntable for playing records comprising a tone arm, mechanism for supporting said tone arm for horizontal and vertical movement with respect to said turntable, a pickup including a stylus and including means for supporting it on a record independently of said tone arm with the stylus engaging the playing groove whereby said stylus moves said pickup toward the center of the record during playing thereof, means coupling said tone arm to said pickup for elevating said pickup when said tone arm is elevated, and a brush attached to said tone arm for engaging the record and moving said tone arm inwardly toward the center of said record simultaneously with similar movement of said pickup.

7. A pickup system for a phonograph having a base plate and a rotatable turntable for playing records comprising a tone arm, mechanism for supporting said tone arm for horizontal and vertical movement with respect to said turntable, a pickup including a stylus and including means for supporting it on a record independently of said tone arm with the stylus engaging the playing groove whereby said stylus moves said pickup toward the center of the record during playing thereof, means coupling said tone arm to said pickup for elevating said pickup when said tone arm is elevated, and means attached to said tone arm for engaging the playing groove of the record and moving said tone arm inwardly toward the center of said record simultaneously with similar movement of said pickup.

8. A pickup system for a phonograph having a base plate and a rotatable turntable for playing records comprising a pickup including a stylus, means attached in fixed relation to said pickup for engaging a record and supporting said pickup on the record with the stylus engaging the playing groove, and means including a flexible hitch connecting said pickup to said base plate for holding said pickup in tangent playing relation to the playing groove of a rotating record.

9. A pickup system for a phonograph having a base plate and a rotatable turntable for playing records comprising a tone arm, mechanism for supporting said tone arm for horizontal and vertical movement with respect to said turntable, a pickup including a stylus and operatively associated with said tone arm for limited vertical movement with respect thereto, means attached to said pickup for engaging a record and supporting said pickup on the record with the stylus engaging the playing groove and freeing said pickup of vertical support by said tone arm when said supporting means engages a record, and a flexible hitch coupled between said pickup and said tone arm support mechanism for holding said pickup in playing position on said record.

References Cited in the file of this patent

UNITED STATES PATENTS

| | | |
|---|---|---|
| 1,193,242 | Delay | Aug. 1, 1916 |
| 1,522,547 | Roehrig | Jan. 13, 1925 |
| 1,705,017 | Jakosky | Mar. 12, 1929 |
| 1,959,423 | Harrison | May 22, 1934 |
| 1,963,673 | Patino | June 19, 1934 |
| 2,314,345 | Cortella | Mar. 23, 1943 |
| 2,522,384 | Lapir | Sept. 12, 1950 |
| 2,568,447 | Gurewitch | Sept. 18, 1951 |
| 2,586,422 | Fisher | Feb. 19, 1952 |
| 2,660,437 | Harman | Nov. 24, 1953 |

FOREIGN PATENTS

| | | |
|---|---|---|
| 430,799 | Italy | Feb. 20, 1948 |